US007870376B2

(12) United States Patent
Gierens et al.

(10) Patent No.: US 7,870,376 B2
(45) Date of Patent: Jan. 11, 2011

(54) SYSTEM, METHOD AND PROGRAM PRODUCT FOR CONTROLLING ACCESS TO COMPUTER SYSTEM

(75) Inventors: Konrad Gierens, Gaeufelden-Oeschelbronn (DE); Erich Hindermeyer, Dettenhausen (DE); Thomas Gerhard Moegerle, Unterensingen (DE); Thomas Speidel, Markgroeningen (DE)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 11/086,184

(22) Filed: Mar. 22, 2005

(65) Prior Publication Data
US 2005/0257050 A1 Nov. 17, 2005

(30) Foreign Application Priority Data
Mar. 23, 2004 (EP) .................................. 04101196

(51) Int. Cl.
*G06F 9/00* (2006.01)
(52) U.S. Cl. ............................ 713/2; 713/165; 713/183; 726/2
(58) Field of Classification Search .................... 713/1, 713/2, 188, 194, 100, 165, 183; 380/200, 380/201, 255, 277; 726/2
See application file for complete search history.

(56) References Cited

U.S. PATENT DOCUMENTS 5,911,042 A 6/1999 Kugue (Continued)

FOREIGN PATENT DOCUMENTS

CN 1372191 A 10/2002

(Continued)

OTHER PUBLICATIONS

Soyo: "SY-67E+ Motherboard Manual," Internet Article, Mar. 5, 1999. http://www.soyogroup.com/dl/manuals/686/m6zep10.pdf.

(Continued)

*Primary Examiner*—Kimyen Vu
*Assistant Examiner*—Joseph Pan
(74) *Attorney, Agent, or Firm*—Arthur J. Samodovitz

(57) ABSTRACT

The computer system initially operates in a fully operational mode in which an operating system in the computer system is operating and the computer system executes one or more user applications installed in the computer system. In response to a predefined time interval lapsing, the computer system automatically switches from the fully operational mode to a limited operational mode in which the one or more user applications are terminated, the operating system is shut down, and a BIOS within the computer system solicits entry of a password by a user. If the user fails to enter a valid password, operation of the operating system and execution of the one or more user applications are prevented. If a user attempts to activate the computer system for which the time interval has already lapsed, a BIOS within the computer system boots up, determines that the computer system is currently set for a limited operational mode, prevents boot up of an operating system of the computer system, and solicits a password from a user. If the user fails to enter a valid password, the BIOS continues to prevent boot up of the operating system. If the user enters a valid password, the operating system boots up and executes one or more user applications within the computer system.

19 Claims, 3 Drawing Sheets

U.S. PATENT DOCUMENTS

| | | | |
|---|---|---|---|
| 5,931,948 A | 8/1999 | Morisawa et al. | |
| 6,038,667 A * | 3/2000 | Helbig, Sr. | 726/16 |
| 6,370,649 B1 * | 4/2002 | Angelo et al. | 726/18 |
| 6,374,145 B1 * | 4/2002 | Lignoul | 700/17 |
| 6,446,213 B1 * | 9/2002 | Yamaki | 713/300 |
| 6,647,498 B1 | 11/2003 | Cho | |
| 6,751,088 B2 * | 6/2004 | Kato | 361/679 |
| 6,832,311 B2 * | 12/2004 | Morisawa | 713/1 |
| 6,904,535 B2 * | 6/2005 | Yamada et al. | 713/324 |
| 7,188,239 B2 * | 3/2007 | Funayama | 713/2 |
| 7,206,951 B2 * | 4/2007 | Ishibashi et al. | 713/323 |
| 7,249,249 B2 * | 7/2007 | Freeman et al. | 713/1 |

FOREIGN PATENT DOCUMENTS

| | | |
|---|---|---|
| EP | 0752638 A2 | 1/1997 |
| EP | 1035472 A2 | 9/2000 |
| GB | 2347248 A | 2/1999 |
| JP | 08-06659 | 1/1996 |
| JP | 09237229 A2 | 9/1997 |
| JP | 11085335 A2 | 3/1999 |
| JP | 2000259272 A2 | 9/2000 |
| JP | 2003140766 A2 | 5/2003 |
| JP | 2004-259000 | 9/2004 |
| WO | WO 03/046701 A2 | 6/2003 |

OTHER PUBLICATIONS

UK Technical Support: "How to Bypass BIOS 1, 8, 15 Passwords", Internet Article, Oct. 2, 2002. http://uktsupport.co.uk/reference/biosp.htm.

IBM: IBM ThinkPad 600 User's Reference Internet Article, Jan. 1, 1999, XP002396027. ftp://ftp.software.ibm.com/pc/pccbbs/mobiles/600userrf.pdf.

IBM: IBM ThinkPad 600 Online Book Internet Article, Jan. 1, 1999, XP002396028. ftp://ftp.software.ibm.com/pc/pccbbs/mobiles/600supug.pdf.

* cited by examiner

SYSTEM, METHOD AND PROGRAM PRODUCT FOR CONTROLLING ACCESS TO COMPUTER SYSTEM

FIELD OF THE INVENTION

The present invention relates generally to computer systems, and more particularly to preventing access by an unauthorized person to a computer, such as in the case of theft of the computer.

BACKGROUND OF THE INVENTION

When many different people share a computer system, access to the computer system or to parts of the computer system has to be controlled. Access control is currently known so that only authorized users can make use of the computer system and its associated user application(s). Access control prevents usage of the computer system by non-authorized persons. In this way, access control protects a computer system or parts of a computer system from misuse.

The most common access control techniques are based on a password driven access to the computer system. There exist different levels of password access or password protection of computer systems. Typically, a password access is either user related or device oriented. The user related access makes use of a user identifier ("userID") that is unequivocally associated to each authorized user of the computer system. Before making use of the computer system, each user has to pass an authentication or login procedure thereby confirming his or her identity. Typically, the user has to enter a valid combination of user identifier and password. Only when the user has successfully passed the login procedure, access to the computer system is granted. Typically, such user related authentication procedures are purely software implemented and are commonly used by the most common multi-user operating systems such as e.g. UNIX™ (licensed by X/Open Company Limited), LINUX™ (of Linus Torvalds), or Windows™ (of Microsoft Corporation) operating system.

Device oriented authentication procedures protect hardware or hardware components of the computer system from unauthorized modification. For example, BIOS-password protection or hard disc drive (HDD) password protection are common techniques to prevent unauthorized persons from modifying the hardware configuration of a computer system.

Even though there are advanced encryption mechanisms for storing user identifications and associated passwords on the computer system, a misuse by unauthorized users is still possible. Any unauthorized person that takes possession of a valid combination of user identification and corresponding password gets access to the computer system.

Access protection of mobile computer systems is important when the computer system is stolen. It is important to protect the data from the thief. Also, a stolen computer system becomes worthless to a thief, when the thief has no access to user identification and password or has no means to circumvent the inherent access controlling mechanism. Within the framework of personal computer systems, an unauthorized user can in principal seize control of the computer system, i.e. circumvent the protection mechanism by simply installing another operating system or different time interval setting program on a stolen computer system.

The above described access protection techniques as they are known from the prior art are not appropriate in an industrial environment where many users share one mobile computer system. For example, in the field of portable diagnosis computer systems for automotive engines and other industrial applications, password driven access to the diagnosis system is inconvenient because the diagnosis system is shared by many different users. It would be burdensome for each user to have to authenticate himself or herself multiple times each day.

Accordingly, an object of the present invention is to control access to a computer system to deter theft and other unauthorized use, without requiring conventional password protection.

SUMMARY OF THE INVENTION

The present invention resides in a system, method and program product for controlling access to a computer system. The computer system operates in a fully operational mode in which an operating system in the computer system is operating and the computer system executes one or more user applications installed in the computer system. In response to a predefined time interval lapsing, the computer system automatically switches from the fully operational mode to a limited operational mode in which the one or more user applications are terminated, the operating system is shut down, and a BIOS within the computer system solicits entry of a password by a user. If the user fails to enter a valid password, operation of the operating system and execution of the one or more user applications are prevented.

The present invention also resides in a system, method and program product for controlling access to a computer system. A user attempts to activate the computer system. In response, a BIOS within the computer system boots up, determines that the computer system is currently set for a limited operational mode, prevents boot up of an operating system of the computer system, and solicits a password from a user. If the user fails to enter a valid password, the BIOS continues to prevent boot up of the operating system. If the user enters a valid password, the operating system boots up and executes one or more user applications within the computer system.

The following are features which can be included in the present invention:

The invention provides a method of access protection of a computer system having a locked and an unlocked mode. Being in locked mode, the functionality of the computer system is limited to a password dialogue interrupting a boot process of the computer system. An interrupted boot process of the computer system only proceeds in response of a user entering the correct password in the password dialogue. Entering of an incorrect password in the password dialogue for a predefined number of times deactivates the computer system. The computer system switches from unlocked mode into the locked mode when a predefined time interval has elapsed. When the computer system is deactivated it becomes useless for an unauthorized person or a thief. When deactivated, a time delay is enforced after which the password dialogue of the locked mode appears again. Generally, the password for reactivating the computer system or for switching the computer system from the locked mode into the unlocked mode is not known to any user. Such a password is only needed in exceptional situations, such as when a theft or unauthorized handling of a computer system. While in ordinary use the period of the time interval keeps the computer system in the unlocked mode, i.e. no password is required for the usage of the computer system.

In locked mode, the boot process of the computer system is interrupted by the password dialogue prior to a booting of an operating system of the computer system. Consequently, the password dialogue of the locked mode is independent of the operating system in use. Preferably, the password dialogue is implemented in a booting process of the computer system's BIOS. In this way, an unauthorized person such as a thief is not able to circumvent the password dialogue by installing a different operating system or other software product trying to disable the access control.

The time interval controlling the switching into the locked mode is defined by an update process of a user application(s) or by an authenticated user. By performing the update process of the user application(s), the time interval is extended to extend the time frame for which the computer system is running in the unlocked mode. Alternatively, the time interval can be manually defined by an authenticated user.

The time interval defined by the update process of the user application(s) elapses after the date from where a subsequent update of the user application(s) becomes available. Assuming that whenever a user application(s) update becomes available, the update is also installed on the computer system, the time interval is extended such that the subsequent user application(s) update is available before the redefined time interval elapses. Subsequently installing all available and provided user application(s) updates prevents the computer system from switching into locked mode. When in ordinary use, i.e. regularly installing user application(s) updates, the user does not even realize that there exists an access protection of the computer system. Only in the exceptional situation, when for example the computer system is subject to theft or when an available user application(s) update is not installed on the computer system, the time interval elapses and the computer system switches into the locked mode.

The time interval is given by a specific time and date or by a maximum allowable operation time of the user application (s). Consequently, the time interval either serves as an expiry date of the user application(s) and the entire computer system or as a time meter defining the time interval for which the user application(s) and/or the computer system operate in unlocked mode. The password of the password dialogue is generated on the basis of a hardware identifier of the computer system. The hardware identifier, e.g. a serial number of the computer system, is stored in a nonvolatile memory of the computer system and is displayed in the password dialogue. The hardware identifier uniquely identifies each computer system. By storing the hardware identifier in a nonvolatile memory that cannot be manipulated by an operating system of the computer system, it becomes almost impossible for a thief to erase or manipulate the hardware identifier. Making use of this hardware identifier, it is easy to determine whether a portable computer system has been stolen or has been subject to unauthorized usage. Reactivating or unlocking the computer system comprises the steps of transmitting the hardware identifier and required user information to a central database system, checking an authentication of the user by the central database system on the basis of the hardware identifier and the user information, receiving a correct password from the central database system when the authentication of the user has been asserted by the central database system and finally entering the received password in the password dialogue in order to reactivate or unlock the computer system. When a computer system is purchased by a user from a supplier, the user has to register in the central database system by providing particular user specific information together with the hardware identifier of the purchased computer system. By means of this registering procedure, the user becomes legitimated to receive updates of the user application(s) as well as to receive the correct password for his particular computer system. The central database system will not deliver the password or time interval setting program update to a user that is not registered. As a consequence an unauthorized person contacting the central database system thereby transmitting the hardware identifier of the computer system on the one hand would not receive the correct password and on the other hand would provide the central database system with a hardware identifier of a stolen computer system.

DETAILED DESCRIPTION OF THE PREFERRED EMBODIMENTS

The present invention will now be described in detail with reference to the figures.

Figure 3:
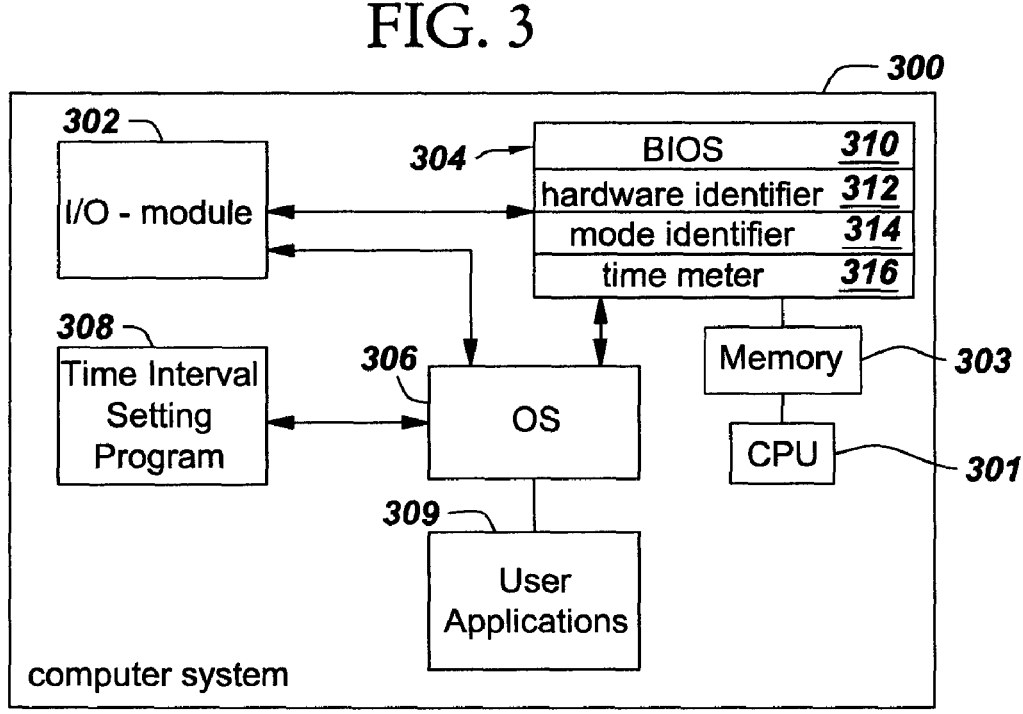
FIG. 3 is a block diagram of a computer of a distributed computer system, according to the present invention.

FIG. 3 illustrates computer system 300 which incorporates the present invention. The computer system 300 has an input/output module 302, a nonvolatile memory 304, an operating system 306, a central processing unit 301, a memory 303, a time interval setting program 308, and one or more user applications 309. A Basis Input/Output System code ("BIOS") 310, hardware identifier 312, mode identifier 314 and time meter 316 are stored in the nonvolatile memory 304. The operating system can be any of a wide variety of known operating systems such as Windows™ (of Microsoft Corporation) operating system, UNIX™ (licensed by X/OPEN Company LTD), Linux™ (of Linux Torvalds), etc. The user applications can be any of a wide variety of known user applications such as word processing software, web browsers, business applications, etc. In the illustrated embodiment, the BIOS 310 includes known microcode that controls basic hardware operations such as a interactions with disk drives and the keyboard. The BIOS 310 also includes microcode according to the present invention to control access to computer system 300. (The BIOS is typically preloaded into the computer system 300, but can also be delivered to the computer system via a computer readable storage medium such as a disk or tape, or downloaded via a network.) The hardware identifier uniquely identifies the computer system 300. The time meter specifies a time interval or expiration time and date for unlocked, full operational access to computer system 300. By way of example, the time interval is a week to a month. The mode identifier specifies whether the system is currently configured in a locked mode, unlocked mode or a deactivated mode. In the unlocked mode, the computer system will fully perform its normal operations, i.e. the BIOS will fully boot up, and the operating system and application(s) 309 will execute. In the locked mode, the computer system 300 will not perform its normal operations, the operating system will not run and therefore the user application(s) 309 will not run. Also, in the locked mode, the boot process will operate in a limited manner to display the hardware identifier and solicit a password from a user and evaluate the password, but not initiate activation of the operating system unless a valid password is entered. In the deactivated mode, the computer system will operate in a limited manner as in the locked mode. In addition, in the deactivated mode, the computer system will delay the display of the hardware identifier and the solicitation of the password, to slow efforts of a hacker. The time interval is either in the form of a period of time during which the computer system is unlocked or in form of a specific expiration time and date when the computer system becomes locked.

Hidden from the user, the computer system 300 uses the specified time interval as follows. When the computer system 300 is booted, the BIOS checks whether the time interval has elapsed. If the time interval has elapsed, the BIOS switches the computer system into the locked mode and initiates a corresponding password dialogue to solicit a password from the user. If the user enters a valid password, the BIOS will unlock the computer. During the unlocked mode, the computer system 300 operates in a normal manner to execute is applications. Before the expiration of the time interval, a legitimate user or administrator can advance the time interval, either by direct update of the time interval in time meter 316, entry of a software update which advances the time interval or request to a central database system 406 (FIG. 4) for programming to advance the time interval. If the computer system is stolen, when the time interval elapses, the thief will no longer have access to the computer system in the operational state. The thief will not have the password or any software update for the time interval, and so cannot extend the time interval. Presumably, the legitimate owner will notify the central database system that the computer system has been stolen, so the central database system will not assist the thief in unlocking the computer.

The hardware identifier, the mode identifier and the time meter specifying the time interval are needed for an initialization and execution of the password dialogue. Consequently, they are accessible prior to booting of the operating system 306. Furthermore, these parameters are stored in a nonvolatile memory to ensure that the parameters are not erased when the computer system is detached from a power supply. Moreover, the parameters are generally not modified by reinstalling the time interval setting program 308 or operating system. The time interval or the time meter can only be modified by installing a an update to time interval setting program 308, or by an authenticated user that passes a conventional authentication procedure and manually updates the time interval.

When a user purchases the computer system 300 from a supplier together with a service or maintenance agreement, the user will be supplied with updates to the time interval setting program within regular time intervals. By installing the updates appropriately, the software updates will advance the time interval and consequently, the computer system 300 will not switch to the locked mode. For practical reason, the computer system may inform the user to install an available update before the computer system switches into locked mode. In another case, when a user purchases the computer system and the time interval setting program without a service or maintenance agreement, the user will be supplied with a password allowing the user to manually modify the time interval. In either case the theft protection or access protection of the computer system becomes active after the predefined time interval has elapsed.

Figure 4:
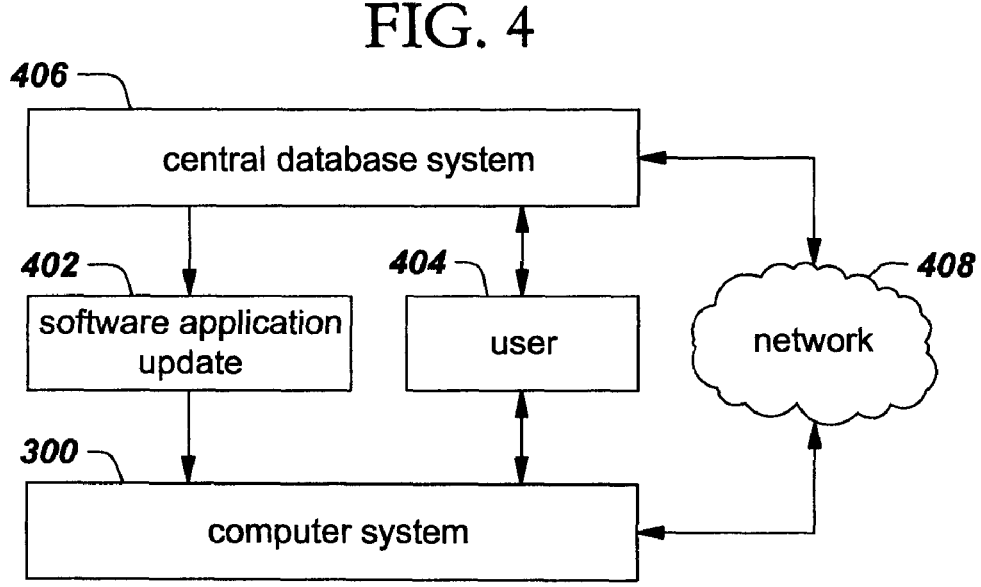
FIG. 4 illustrates the distributed computer system of FIG. 3.

FIG. 4 shows a block diagram of the environment for the access protection of the computer system. Basic components of the environment are the computer system 300, an update 402 to the time interval setting program, a user 404, a central database system 406 and a network 408 which interconnects computer system 300 to the central database system 406. The user 404 making use of the computer system 400 regularly installs the updates 402 on the computer system 400 to advance the timer and unlocked condition. The updates 402 are either provided by the central database system 406 or by a third party supplier.

When the computer system 400 has become subject to theft or when a required update 402 has not been installed on the computer system 400, the computer system switches into the locked mode. In locked mode, the computer system 400 only displays its hardware identifier to the user. An authorized user will know and can enter (the hardware identifier and) required information about his or her own identity to the central database system to obtain access. Based on the provided hardware identifier the central database system 406 can determine if the computer system 400 has been reported as stolen. Moreover, the central database system 406 is able to authenticate the user 404 as the legitimate user of the computer system 400. Only when the legitimate user has been identified by the central database system, the password required to unlock or to reactivate the computer system 400 is returned to the user 404. Presumably, the password is generated on the basis of the hardware identifier and some specific encryption algorithm being executed by the central database system and by the BIOS of the computer system 400.

A new update 402, when installed, may also incorporate an update of this encryption algorithm in the BIOS of the computer system 400. Such an update has two advantages. First, each password is specific to only one computer system 400 and cannot be universally applied to different computer systems. Second, a password obtained from the central database system 406 unlocks or reactivates a computer system 400 only once. Consequently, it cannot be applied repeatedly when the computer system locks again after the predefined time interval elapses for a second time.

Alternatively, the interaction between the computer system 400 and the central database system 406 can also be realized by making use of network 408. In this case the computer system 400 automatically establishes a network connection to the central database system 406 and transmits its hardware identifier autonomously to the central database system 406. The central database system 406 will solicit additional information, via network 408) about the user 404 to determine whether the user 404 is the legitimate user of the computer system 400. This transmission can either be performed by the user directly transmitting the required information to the central database system 406 or by entering the required information into an expanded password dialogue of the computer system 400. The computer system 400 then transmits this additional information via the established network connection to the central database system 406.

Figure 1:
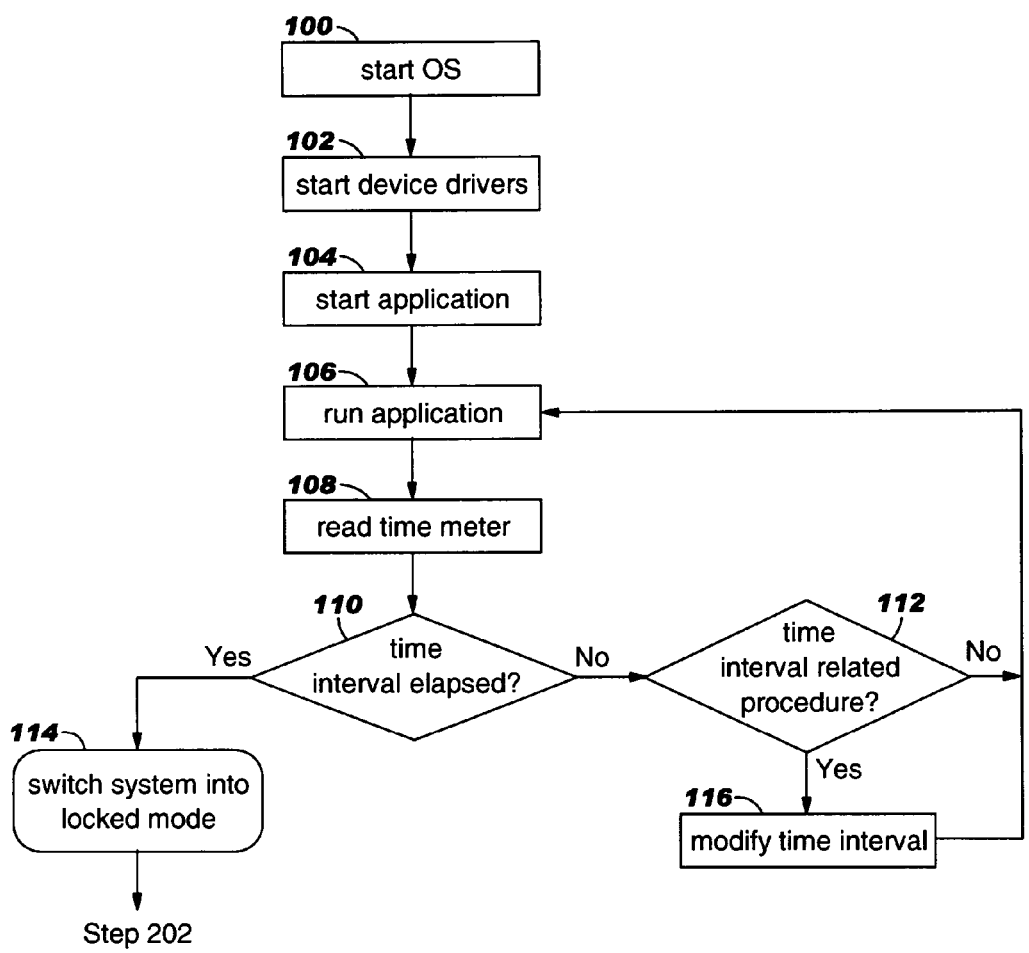
FIG. 1 is a flowchart of the computer system operating in unlocked mode.

FIG. 1 is a flowchart of computer system 300 operating in the unlocked mode. After the computer 300 has been switched on, the BIOS code is booted up and checks whether the system is operating in the locked or unlocked mode (based on the mode identifier). If the computer system operates in the unlocked mode, then operating system 306 starts/boots up (step 100). Next, the BIOS starts various device drivers (step 102). Next, the operating system starts time interval setting program 308 and user application(s) 309 (step 104).

As explained above, BIOS 310 controls the time interval for access to computer system 300. User application(s) 309 proceed in their ordinary operating mode, i.e. the running mode (step 106), and the BIOS reads the time meter 316 to determine if the time interval has lapsed (step 108). The time interval specifies either a distinct expiration time and date at which the computer system 300 switches from the unlocked into locked mode or a time period during which the entire computer system 300 can be used in the unlocked mode. If the time interval has lapsed (decision 110, yes branch), then the BIOS 310 shuts down operating system 306 (in an orderly manner) which shuts down user application(s) 309, updates the mode identifier to "locked" (step 114). Thus, BIOS 310 switches the computer system 300 into the locked mode. Refer again to decision 110, no branch, where the time interval has not lapsed. In such a case, the BIOS checks whether the time interval has lapsed or nearly lapsed, and a procedure should be performed to extend the time interval. Examples for such time interval extension procedures are installing an update 42 to extend the time interval or manually modifying the time interval by an authenticated user. If no such procedure is needed at this time (decision 112, no branch), then BIOS 310 returns to step 106 to continue in its ordinary operation mode. However, if a procedure needs to be performed within the time interval to extend the time interval (decision 112, yes branch), then the BIOS initiates this procedure (step 116). When for example in decision 112, the BIOS detects that an update 42 needs to be installed, then the BIOS modifies the time meter in step 116 such that the computer system operates in unlocked mode at least until a successive update becomes available. Performing a time interval related action in step 116 involves either resetting of the time meter or redefining the time interval specifying the point of time after which the computer system switches to the locked mode. After execution of step 116, the BIOS returns to the step 106 where the user application(s) continue to operate in their ordinary mode.

Steps 108 through 116 are performed while the user application(s) 309 are running. Preferably, these steps are performed on a regular basis at predefined time intervals, such as every five or ten minutes. As noted above, in the illustrated embodiment, the BIOS performs steps 108 through 116 so that access protection according to the present invention is independent of the operating system and software configuration of computer system 300.

Figure 2:
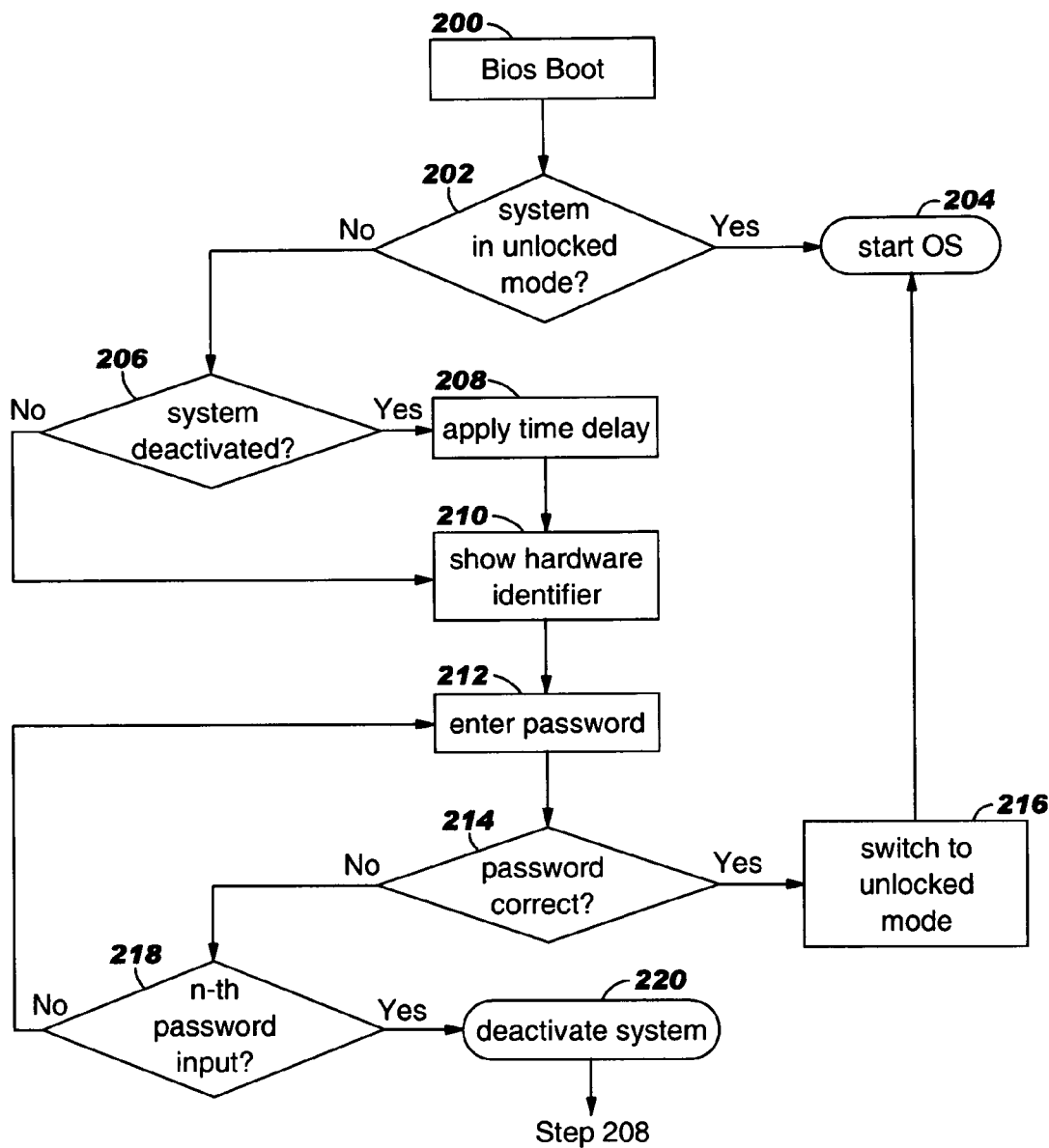
FIG. 2 is a flowchart of the computer system operating in locked mode.

FIG. 2 illustrates a flowchart of the BIOS and other programming within the computer system 300 operating in the locked mode. This would be the situation after a thief steals the computer system (or a legitimate owner fails to advance the time interval) and the time interval lapses. After the computer system 300 is turned on, the BIOS code is automatically booted up (step 200). Directly thereafter, i.e. prior to a booting procedure of the operating system 306, the BIOS checks the mode identifier to determine whether the system 306 is in unlocked mode (decision 202). If the system 300 is in the unlocked mode, then the BIOS starts the operating system (step 204). In this case, the system 300 operates in the unlocked mode and the procedure illustrated in FIG. 1 is implemented. However, if the system 300 is in locked mode (decision 202, no branch), then the BIOS checks if the system 300 is deactivated (decision 206). This check is performed by checking the mode identifier. If system 300 has been deactivated, then the BIOS waits a predetermined time delay that was previously configured and recorded (step 208). The time delay of step 208 can be constant or can increase every time it is applied. During application of this time delay, the computer system is not accessible, i.e. the screen does not display anything and the system does not react to input made by a keyboard, mouse or other type of input device. After the time period specified by the time delay in step 208 has elapsed, the BIOS causes the hardware identifier of the computer system to be displayed on the screen of the computer system (step 210).

Refer again to decision 206, no branch, where the system has not been deactivated, the BIOS 310 proceeds to step 210 to display the hardware identifier without applying any kind of time delay.

In the illustrated embodiment, the functionality of the computer system 300 is limited in step 210 in the locked mode to the display of the hardware identifier as part of a password dialogue. The hardware identifier is needed to unequivocally identify the computer system. A legitimate user of the computer system may use the hardware identifier to receive the password for the password dialogue from a central database system 406 (shown in FIG. 4). When the legitimate user has received the correct password from the central database system, the legitimate user enters the password into the password dialogue in step 212. Next, the BIOS checks whether or not the password is correct (decision 214). If the password is correct (decision 214, yes branch), then the BIOS switches the computer system from either deactivated or locked mode into the unlocked mode (step 216). After being switched into the unlocked mode, the BIOS starts or boots up the operating system of the computer system (step 204).

Refer again to decision 214, no branch where a user enters an incorrect password, and the BIOS detects the incorrect password. In such a case, the BIOS checks whether an incorrect password has already been entered a predefined number of times (decision 218). The number of times that an incorrect password can be entered without deactivating the system can either be specified by an authenticated user or by the time interval setting program. If the incorrect password has already been entered the predefined number of times, this may indicate an unauthorized user such as a "hacker", and in response, the BIOS deactivates system 300 (step 220). Next, the BIOS returns to step 208 to apply the time delay, and then to step 210 to permit reactivation of system 300, assuming the user enters the proper password. Refer again to decision 218, no branch, where an incorrect password has not yet been entered for a predefined number of times. In this case, it is premature to assume an unauthorized user, so the BIOS returns to step 212 without deactivating the system, to permit the user to re-enter the password.

The computer system does not switch into the unlocked mode by simply rebooting. Whenever the computer system runs into the locked or deactivated mode it remains in this particular mode unless the correct password is entered in the password dialogue. Being once in locked or deactivated mode, booting of the computer system is disabled. As a consequence an unauthorized user or thief has no possibility to manipulate the hardware or software configuration of the computer system. Consequently, not only the user application (s) but the entire computer system becomes useless for such an unauthorized user.

When in ordinary operation mode, i.e. unlocked, activated mode, the computer system 300 including user application(s) 309 operates as a conventional computer system (except for the BIOS performing periodic checks to determine if the time interval has lapsed). During run time in this ordinary operation mode, a user can interact with the user application(s) 309 via the input/output module 302 to attain the normal function of user application(s) 309. Operating system 306 controls execution of input/output module 302 and the user application(s) 309.

Based on the foregoing, a computer system, method and program product for controlling access to a computer system have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A computer implemented method of controlling access to a computer system, said method comprising the steps of:
   said computer system operating in a fully operational mode in which an operating system in said computer system is operating and said computer system executes one or more user applications installed in said computer system;

in response to a predefined time interval lapsing, said computer system automatically switching the computer system from said fully operational mode to a limited operational mode in which said one or more user applications are automatically terminated, said operating system is automatically shut down, and a BIOS within said computer system automatically solicits entry of a password by a user, and if said user fails to enter a valid password, said computer system preventing operation of said operating system and execution of said one or more user applications.

2. A method as set forth in claim 1 wherein if said user fails to enter a valid password, said computer system maintaining said limited operational mode of said computer system.

3. A method as set forth in claim 1 wherein in response to said limited operational mode and a user entering incorrect password(s) a predefined number of times, said computer system deactivating said computer system.

4. A method as set forth in claim 1, wherein in said limited operational mode, said operating system is shut down by said BIOS.

5. A method as set forth in claim 1, wherein in response to said legitimate user or administrator (a) manually updating a file within said computer system, said file specifying said time interval or (b) installing a software update which updates said file, said computer system extending said time interval.

6. A method as set forth in claim 1 wherein while said computer system is in the limited operational state, said BIOS also initiates display of an identification of said computer system.

7. A method as set forth in claim 1 further comprising the subsequent steps of:

in response to a legitimate user of said computer system transmitting an identifier of said computer system and information about said legitimate user to a central database system, said central database system checking legitimacy of said user based on said hardware identifier and user information, and if said user is legitimate, said central database system sending a valid password to said user.

8. A computer system for controlling operation of an operating system and one or more user applications within said computer system, said computer system comprising:

a CPU, a memory and a computer readable storage;

first program instructions to operate said computer system in a fully operational mode in which the operating system and the one or more user applications are operating; and a BIOS program within said computer system;

second program instructions, responsive to lapse of a predefined time interval, to automatically switch the computer system from said fully operational mode to a limited operational mode in which said operating system and said one or more applications do not operate, and said BIOS program solicits entry of a password by a user, and if said user fails to enter a valid password, said second program instructions prevent operation of said operating system and said one or more user applications; and wherein said first and second program instructions and said BIOS program are stored on said computer readable storage for execution by said CPU via said memory.

9. A system as set forth in claim 8 further comprising third program instructions, responsive to said user failing to enter a valid password, to maintain said limited operational mode of said computer system; and wherein said third program instructions are stored on said computer readable storage for execution by said CPU via said memory.

10. A system as set forth in claim 8 further comprising third program instructions, responsive to said limited operational mode and a user entering incorrect password(s) a predefined number of times, to deactivate said computer system; and wherein said third program instructions are stored on said computer readable storage for execution by said CPU via said memory.

11. A system as set forth in claim 8, wherein in said limited operational mode, said operating system is shut down by said BIOS program.

12. A system as set forth in claim 8 further comprising third program instructions to enable a legitimate user of said computer system to extend said time interval; and wherein said third program instructions are stored on said computer readable storage for execution by said CPU via said memory.

13. A system as set forth in claim 8, wherein in response to a legitimate user or administrator of said computer system (a) manually updating a file within said computer system, said file specifying said time interval or (b) installing a software update which updates said file, said second program instructions extending said interval.

14. A system as set forth in claim 8 wherein while said computer system is in the limited operational state, said BIOS program also initiates display of an identification of said computer system.

15. A system as set forth in claim 8 further comprising:

third program instructions, for storage and execution within a central database system, to receive from a legitimate user of said computer system an identifier of said computer system and information about said legitimate user, and in response, check legitimacy of said user based on said hardware identifier and user information, and if said user is legitimate, send a valid password to said user.

16. A computer program product for controlling operation of an operating system and one or more user applications within said computer system, said computer program product comprising:

a computer readable storage medium;

first program instructions to operate said computer system in a fully operational mode in which said operating system is operating and said computer system executes said one or more user applications;

a BIOS program;

second program instructions, responsive to a predefined time interval lapsing, to automatically switch the computer system from said fully operational mode to a limited operational mode in which said operating system and said one or more user applications do not operate, and said BIOS program solicits entry of a password by a user, and if said user fails to enter a valid password, said second program instructions prevent operation of said operating system and said one more user applications; and wherein said first and second program instructions and said BIOS program are stored on said computer readable storage medium.

17. A method of controlling access to a computer system, said method comprising the steps of:

in response to a user attempting to activate the computer system, a BIOS within said computer system booting up, determining that said computer system is currently set for a limited operational mode, preventing boot up of an operating system of said computer system, and soliciting a password from a user; and in response to said user failing to enter a valid password, said BIOS continuing to prevent boot up of said operating system, and in response to said user entering a valid password, said BIOS causing said operating system to boot up and execute one or more user applications within said computer system.

18. A method as set forth in claim 17 further comprising the step of responding to an action by a legitimate user of said computer system by extending said time interval.

19. A computer system for controlling operation of an operating system and one or more user applications within said computer system, said computer system comprising:

a CPU, a memory and a computer readable storage;

a BIOS program programmed to boot up in response to a user attempting to activate the computer system, and determine that said computer system is currently set for a limited operational mode, and in response, prevent boot up of said operation system; and wherein said BIOS program is programmed to respond to said user failing to enter a valid password by continuing to prevent boot up of said operating system, and programmed to respond to said user entering a valid password by causing said operating system to boot up and execute one or more user applications within said computer system; and said BIOS program is stored in said computer readable storage for execution by said CPU via said memory.

* * * * *